United States Patent [19]
Taylor et al.

[11] Patent Number: 4,815,574
[45] Date of Patent: Mar. 28, 1989

[54] FRICTIONLESS DAMPER

[75] Inventors: Douglas P. Taylor, North Tonawanda, N.Y.; David A. Lee, Santa Monica, Calif.

[73] Assignee: Tayco Developments, Inc., North Tonawanda, N.Y.

[21] Appl. No.: 135,257

[22] Filed: Dec. 21, 1987

[51] Int. Cl.<sup>4</sup> ............... F16F 9/04; F16F 9/32
[52] U.S. Cl. .................. 188/280; 188/269; 188/322.15
[58] Field of Search ........... 188/269, 280, 316, 317, 188/318, 322.15, 322.19; 267/140.1

[56] References Cited

U.S. PATENT DOCUMENTS

| | | | |
|---|---|---|---|
| 3,024,874 | 3/1962 | Koning et al. | 188/317 X |
| 3,043,404 | 7/1962 | Peras | 188/280 |
| 3,105,574 | 10/1963 | Hoffmann et al. | 188/317 X |
| 3,469,661 | 9/1969 | Hoffmann et al. | 188/269 |
| 3,662,649 | 5/1972 | Williams | 188/280 X |

Primary Examiner—Duane A. Reger
Attorney, Agent, or Firm—Joseph P. Gastel

[57] ABSTRACT

A frictionless hydraulic damper having a cylinder and a piston head and piston rod connected to the piston head, with the piston head dividing the cylinder into chambers on opposite sides thereof and with the piston rod extending beyond the cylinder, and with sealed bellows extending between the end walls of the cylinder and opposite sides of the piston which confine the fluid to the space between the outside of the bellows and the wall of the cylinder and thus prevent leakage of hydraulic fluid from the cylinder and eliminate the need for fluid seals on the piston rod.

22 Claims, 2 Drawing Sheets

U.S. Patent  Mar. 28, 1989  Sheet 1 of 2  4,815,574
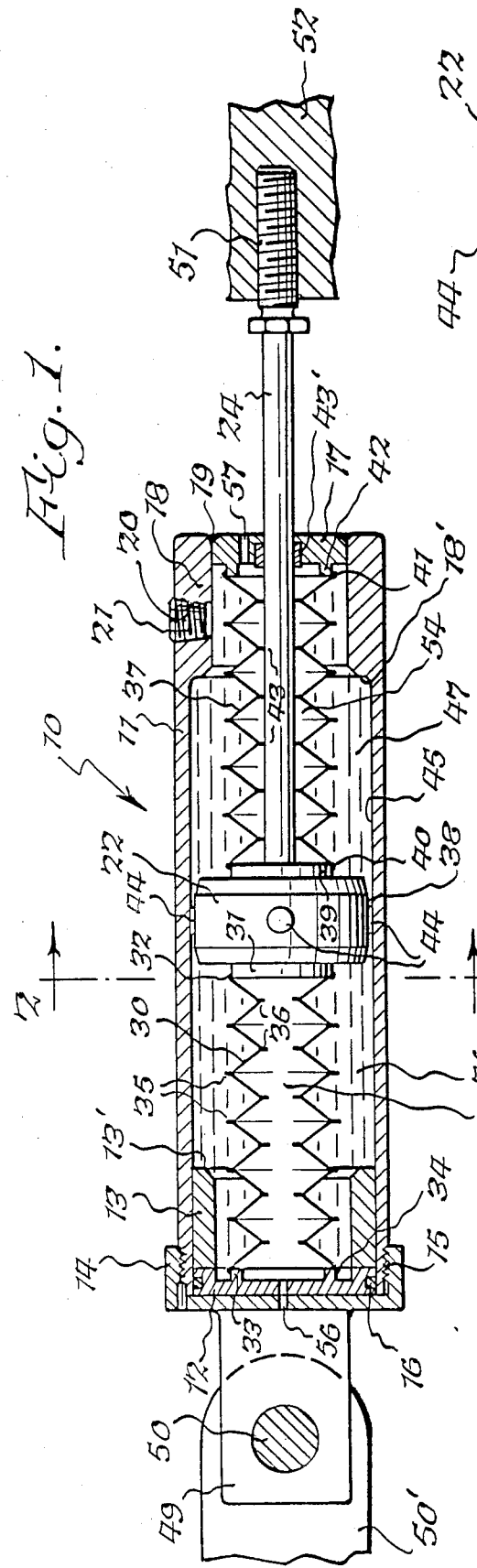
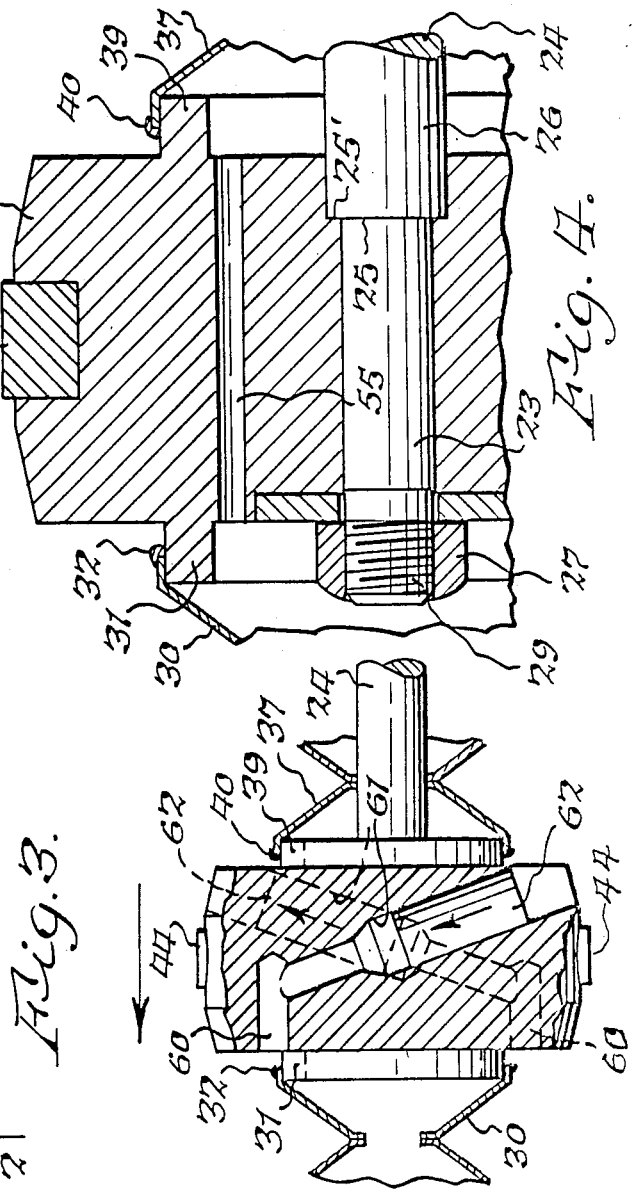
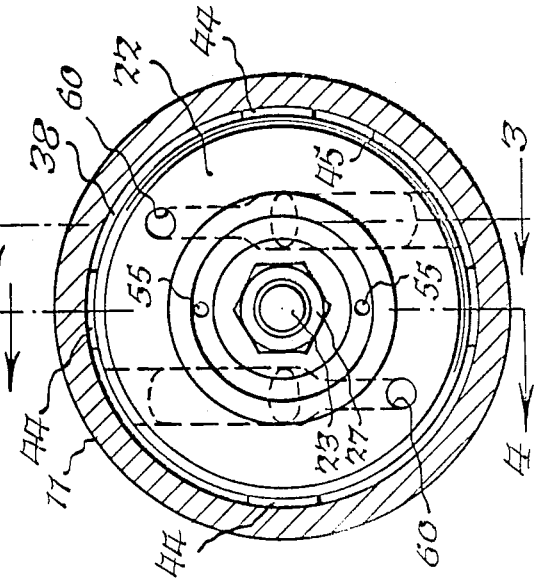

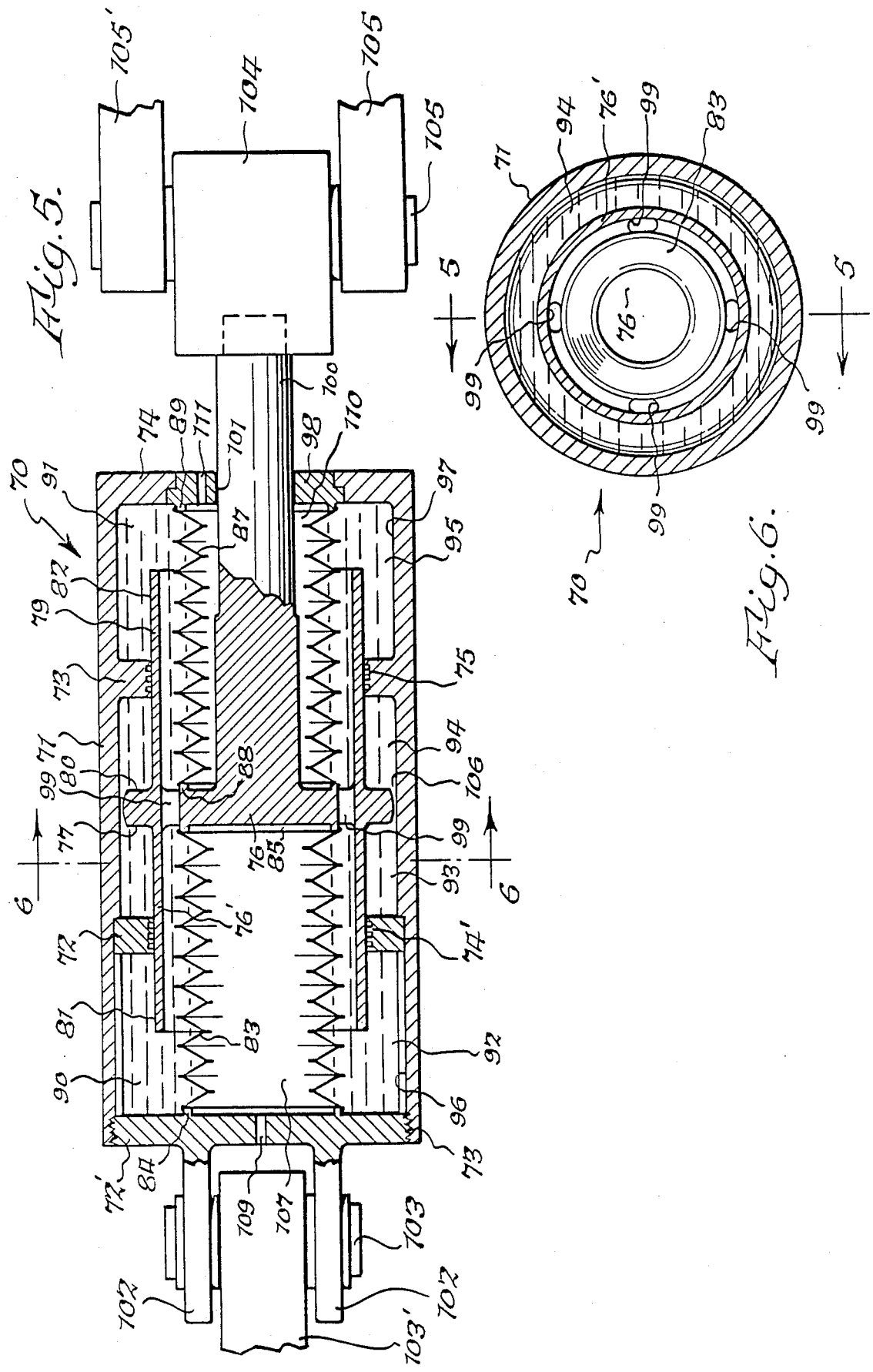

FRICTIONLESS DAMPER

BACKGROUND OF THE INVENTION

The present invention relates to a frictionless hydraulic damper.

By way of background, frictionless hydraulic dampers are desired for certain applications to attenuate forces between relatively movable objects where the internal frictional resistance of the dampers is objectionable. By way of specific example, in nuclear plants small pipes are suspended by hangers in the nature of dampers which are subjected to forces within the 200 to 3,000 pound range. In the past it has been highly impractical to use hydraulic dampers for this application for two reasons. Firstly, radiation affected the plastic or rubber seals and thus permitted them to leak. Secondly, seals create friction, and where small pipes were suspended by dampers which were subjected to forces between 200 and 500 pounds, the seal friction was a substantial portion of the applied forces and thus did not allow the small pipe to move in an unrestrained manner while being supported. Therefore, in the past hydraulic dampers were not used for the foregoing applications, and instead highly complex mechanical snubbers were used. These required high maintenance and many times were unreliable because of their complexity.

In order to overcome the foregoing deficiencies, the devices of U.S. Pat. No. 4,638,895, dated Jan. 27, 1987 and of copending U.S. patent application Ser. No. 6,365 filed Jan. 23, 1987 were devised. There prior devices utilized piston rod seals in the nature of labyrinth seals or bushings in both end walls of a cylinder and a bellows member connected between each of the end walls and the portions of the piston rods outside each of the end walls to contain leakage of hydraulic fluid past the seals or bushings. In addition, the piston rod included ductwork for conducting the hydraulic fluid between the two bellows members at opposite ends of the cylinder. The location of the bellows members caused the prior dampers to be relatively long, which limited their use to spaces which could accept them. Furthermore, the fluid circuit through the piston rod constituted additional structure, and further the additional volume of the bellows required additional hydraulic fluid.

SUMMARY OF THE INVENTION

It is accordingly the primary object of the present invention to provide a frictionless hydraulic damper which is relatively short compared to the above-described prior frictionless dampers.

Another object of the present invention is to provide a frictionless hydraulic damper which is relatively simple in construction as compared to prior hydraulic dampers of this type.

A further object of the present invention is to provide a frictionless hydraulic damper which utilizes a relatively small amount of fluid for its size.

Yet another object of the present invention is to provide an improved frictionless hydraulic damper which effectively eliminates piston rod seals. Other objects and attendant advantages of the present invention will readily be perceived hereafter.

The present invention relates to a fluid damper comprising a cylinder, first and second opposite end walls in said cylinder, piston means, said piston means including an elongated piston rod having a first portion between said first and second end walls and a second portion extending outwardly away from said first portion and a piston head mounted on said first portion of said piston rod, first and second sides on said piston head facing said first and second end walls, respectively, said piston head dividing the space in said cylinder between said first and second end walls into a first cylinder chamber between said first side and said first end wall and into a second cylinder chamber between said second side and said second end wall, guide means for guiding said piston means for linear movement relative to said cylinder, a first fluid-tight bellows in said first chamber mounted in sealed relationship between said first end wall and said first side of said piston, a second fluid-tight bellows in said second chamber mounted in sealed relationship between said second end wall and said second side of said piston, said first portion of said piston rod being located within said second bellows, fluid in said first and second cylinder chambers located entirely outside of said first and second bellows, respectively, orifice means operatively associated with said piston head for permitting flow of fluid past said piston head between said first and second cylinder chambers during movement of said piston head, first engagement means on said cylinder for effecting engagement between said cylinder and a first external object, and second engagement means on said second portion of said shaft for effecting engagement between said shaft and a second external object which is movable relative to said first external object.

The various aspects of the present invention will be more fully understood when the following portions of the specification are read in conjunction with the accompanying drawings wherein:

BRIEF DESCRIPTION OF THE DRAWINGS

FIG. 1 is a cross sectional view of the improved frictionless hydraulic damper of the present invention taken substantially along line 4—4 of FIG. 2;

FIG. 2 is a cross sectional view taken substantially along line 2—2 of FIG. 1;

FIG. 3 is a fragmentary cross sectional view taken substantially along line 3—3 of FIG. 2;

FIG. 4 is a fragmentary enlarged cross sectional view taken substantially along line 4—4 of FIG. 2;

FIG. 5 is a fragmentary cross sectional view of another embodiment of the present invention taken substantially along line 5—5 of FIG. 6; and FIG. 6 is a cross sectional view taken substantially along line 6—6 of FIG. 5.

DESCRIPTION OF THE PREFERRED EMBODIMENTS

The improved hydraulic damper 10 of the present invention includes a cylinder 11 having a first end wall 12 suitably secured between fixedly secured sleeve 13 and the cap 14 which is threaded on the end of cylinder 11 at threads 15. An O-ring 16 is located within a groove (not numbered) within end wall 12 to effect a fluid-tight seal with the cylinder. A second end wall 17 is suitably secured in fluid-tight relationship with thickened cylinder wall 18 at the opposite end of cylinder 11, as by brazing or welding 19. A port 20, which is sealed by plug 21, can be used to fill cylinder 11 with suitable hydraulic fluid.

A piston head 22 is suitably secured on the reduced end portion 23 (FIG. 4) of shaft or piston rod 24. In this respect a shoulder 25 on the enlarged portion 26 of piston rod 24 abuts a shoulder 25' on one side of the piston head, and a nut 27 which threads onto shaft 24 at 29 bears against the opposite side of piston head 22.

A first metal bellows 30 has one end affixed in fluid-tight relationship to annular rim 31 on one side of the piston head by means of an annular weld 32. The opposite end of bellows 30 is affixed in fluid-tight relationship to annular rim 33 on end wall 12 by an annular weld 34. Bellows 30 is fabricated from metal washers which are alternately connected to each other in fluid-tight relationship, as by welding, at their outer ends 35 and their inner ends 36. A second metal bellows 37 has one end connected in fluid-tight relationship to annular rim 39 on the opposite side of piston head 22 by an annular weld 40. The opposite end of bellows 37 is connected in fluid-tight relationship to annular rim 42 of end wall 17 by an annular weld 41. Bellows 37 is also made up of washers which are connected to each other at their inner and outer edges as described above relative to bellows 30. The inner edges 43 of bellows 37 may ride on piston rod 24 to thereby limit bowing of the bellows.

Shaft 24 includes a first portion located between end wall 17 and piston head 22 and a second portion located on the opposite side of end wall 17. The piston rod is guided for linear movement in a loose fitting frictionless bushing 43' mounted on end wall 17. If desired, frictionless bushing 43' may be in the form of a race of ball bearings or any other type of member which will permit shaft 24 to reciprocate through end wall 17 in a substantially frictionless manner.

Piston head 22 includes a plurality of circumferentially spaced cylindrical bosses 44 extending outwardly from piston head 22 and contacting the inner wall 45 of cylinder 11 for guiding it rectilinearly as it moves back and forth. The annular clearance space 38 between the outer periphery (not numbered) of piston head 22 and inner cylinder wall surface 45 preferably constitutes a fluidic damping orifice of the type disclosed in U.S. Pat. No. 3,722,640, but it may be of any shape. The bosses 44 guide the piston head and rod for linear movement.

As can be seen from the above description, the piston head 22 divides the cylinder 11 into two chambers 46 and 47. Chamber 46 is located between one side of piston head 22 and end wall 12. Chamber 46 is essentially annular in that it is bounded by the inner surface 45 of cylinder 11 and the outer surface of bellows 30. Chamber 47 is located between the opposite side of piston head 22 and end wall 17. Chamber 47 is essentially annular in that it is bounded by the inner surface 45 of cylinder 11 and the outside of bellows 37.

An engagement member 49 is secured to cylinder 11 for the purpose of being attached by pin 50 to a first external member 50', which may be the wall of a building. The piston rod 24 has an outer threaded end 51 which is intended to be engaged with another external member 52 which may be a pipe hanger or the like which supports a pipe (not shown) which may have relative movement with respect to external member 50'.

When the movement between external members 50 and 52 is relatively slow, damper 10 functions strictly as a damper in that hydraulic fluid is passed between chambers 46 and 47 through the clearance space 38, and the only essential friction is between the outer edges of bosses 44 and the internal surface 45 of cylinder 11. There is substantially no friction at bushing 43'. Furthermore, bosses 44 can be considered spacer members and there can be a clearance between their outer edges and inner wall surface 45 so that there is substantially no friction. In this respect, as fluid passes between chambers 46 and 47 as the piston head moves back and forth, the hydraulic pressure will act substantially equally on all external surfaces of piston head 22 so as to tend to maintain it centered within internal cylinder surface 45, thereby causing essentially frictionless movement of the piston head, especially when there is the aforementioned clearance at bosses 44.

The chambers 53 and 54 within bellows 30 and 37, respectively, are in communication with each other through ducts 55 (FIGS. 2 and 4) in piston head 22, and bellows 30 and 37 are in communication with the atmosphere through vents 56 and 57, respectively, in end walls 12 and 17, respectively. Thus, as the bellows 30 and 37 are compressed and expanded there will be no compression of air within chambers 53 and 54 of bellows 30 and 37 which could cause resistance to movement of piston head 22.

In the event there is an explosion or earthquake or other violent abrupt force, the damper 10 will lock up to prevent abrupt movement between external members 50 and 52. This is due to the fact that fluid flow is restricted between chambers 46 and 47 by the clearance 38 between piston 22 and cylinder wall 45. However, a pressure relief valve construction is located in piston head 22 for providing relief in the event that predetermined excessive pressures are built up in chambers 46 and 47 due to the forces which tend to cause abrupt movement between external members 50 and 52. To this end bores 60 are in communication with chamber 46 located on one side of piston head 22, and they are in communication with bores 61 which are in communication with chamber 47 on the other side of the piston head. Check valve units 62 are press-fitted within bores 61. Check valve units 62 are self-contained units which provide a checking function in a specific direction. Thus one check valve unit 62 will permit pressure relief from chamber 46 to chamber 47, and the other check valve unit 62 will permit pressure relief from chamber 47 to chamber 46, as shown by the arrows thereon. The check valve units 62 will be preselected to permit flow between chambers 46 and 47 at predetermined pressures.

Annular shoulders 13' and 18' are located on sleeve 13 and thickened wall portion 18, respectively, to define the limits of movement of piston head 22, and it will be appreciated that bellows 30 and 37 are of sufficient length to permit piston head 22 to travel to this extent.

In FIGS. 5 and 6 another embodiment of the present invention is disclosed. A frictionless damper 70 includes a cylinder 71 having a first end wall 72' threaded into it at 73 in fluid-tight relationship. A second end wall 74 is formed at the opposite end of cylinder 71. A first annular rim 72 is located within cylinder 71. A second annular rim 73 is located within cylinder 71 in spaced relationship to annular rim 72. The inner surfaces of annular rims 72 and 73 are formed into the shapes of labyrinth seals 74' and 75, respectively.

A piston head 76 is located between annular rims 72 and 73. A first tubular member 76' extends outwardly from side 77 of piston head 76. A second tubular member 79 extends outwardly from side 80 of piston head 76. The outer surfaces 81 and 82 of tubular members 76 and 79, respectively, are in frictionless sliding engagement with labyrinth seals 74 and 75, respectively, which guide the piston head for linear movement. In this respect, labyrinth seals have a slight clearance with tubular members 72 and 73, respectively. The labyrinth seals may be replaced by planar surfaces having a sufficient clearance with rims 72 and 73 to permit relative frictionless linear movement of tubular members 76 and 79.

A first metal bellows 83 has one end affixed in fluid-tight relationship, as by welding, to annular rim 84 on end wall 72′ and its opposite end affixed in fluid-tight relationship, as by welding, to annular rim 85 on piston head 76. A second metal bellows 87 has one end affixed in fluid-tight relationship, as by welding, to annular rim 89 on end wall 74 and the opposite end affixed in fluid relationship, as by welding, to annular rim 88 on piston head 76. Bellows 83 and 87 may be of the same construction as the bellows in FIGS. 1-4.

Piston head 76 divides cylinder 71 into a chamber 90 on one side of piston head 76 and to another chamber 91 on the opposite side of piston head 76. Chamber 90, in turn, is divided into two chambers 92 and 93 by annular rim 72, and chamber 91 is divided into two chambers 94 and 95 by annular rim 73. Chamber 92 is located between annular rim 72 and end wall 72′ and between the inner surface portion 96 of cylinder 71 and the outer surface of the entire bellows 83 including the portion between it and tubular member 76′. Chamber 95 is located between annular rim 73 and end wall 74 and is further defined by the space between internal cylinder surface 97 and the entire outer surface of bellows 87 including the portion between it and tubular member 82. Ducts 99 are located in piston head 76 to effect communication between chambers 92 and 95. Piston head 76 is located at the end of piston rod or shaft 100 which extends through bore 101 in member 98 in end wall 74, and there is sufficient clearance therebetween so that there is substantially no friction. Member 98 may be formed of material which will produce extremely low friction on shaft 100 as it guides it for linear movement. In this embodiment, member 98 may be eliminated if desired because the linear movement can be guided solely by annular rims 72 and 73.

Engagement means 102, which may be spaced ears, are affixed to cylinder end wall 72′ for engagement by means of a pin 103 to a bracket 103′ secured to an external member, such as a building wall. An engagement means 104 is secured to the end of shaft 100 for mounting a pin 105 which is connected to an external member, such as parts 105′ of a pipe hanger or the like, which carries a pipe.

In operation, when the pipe hanger 105′ moves slowly relative to the building wall, hydraulic fluid will be passed between chambers 93 and 94 through the annular space or orifice 106 between the outer edge of piston head 76 and the inner surface of cylinder 71. The outer edge of piston head 76 may be of the configuration to cause the space 106 to constitute a fluidic damping orifice of the type disclosed in U.S. Pat. No. 3,722,640. As noted above, the rims 72 and 73 provide substantially frictionless support to tubular members 76 and 79, which are essentially extensions which support piston head 76. Since there are clearances at labyrinth seals 74 and 75, there can be leakage between chambers 92 and 93 and between chambers 94 and 95. Assuming there is leakage from chamber 93 to chamber 92 as piston head 76 moves to the left, such leakage will pass through ducts 99 in piston head 76 and into chamber 91 from which it may pass through labyrinth seal 75 into chamber 94. The reverse occurs when there is leakage at seal 75 when piston head 76 moves to the right.

There is no externally applied resistance to the expanding and collapsing of bellows 83 and 87 as piston head 76 moves back and forth because the chamber 107 within bellows 83 is vented to the atmosphere through duct 109 in end wall 72′ and the chamber 110 within bellows 87 is vented to the atmosphere through duct 111 in end wall 74.

It can thus be seen that both embodiments of the present invention are capable of producing substantially frictionless damper operation in hydraulic cylinders which are exceptionally short in length because the bellows which effectively seal the fluid chambers against leakage are located within the cylinder itself in contrast to the prior constructions identified above. In addition, because of the internal bellows construction, the amount of hydraulic fluid which is utilized is much less than if the bellows were not present.

The fluid within the chambers of the various embodiments may be any type of fluid including but not limited to hydraulic fluid, special gases and refrigerant under pressure, considering that piston rod seals are not required.

It will readily be seen that the bellows structures of the present invention not only prevent leakage of the fluid within the damper, but also permit the damper to utilize less damping fluid than a damper of the same size which has a cylinder which is completely filled with damping fluid, while still providing the same amount of damping as the latter.

While the described embodiments show a piston rod extending from only one side of the piston head, it will be appreciated that piston rods can extend from both sides, as may be required for certain applications.

While preferred embodiments of the present invention have been disclosed, it will be appreciated that it is not limited thereto but may be otherwise embodied within the scope of the following claims.

What is claimed is:

1. A fluid damper comprising a cylinder, first and second opposite end walls in said cylinder, piston means, said piston means including an elongated piston rod having a first portion between said first and second end walls and a second portion extending outwardly away from said first portion and a piston head mounted on said first portion of said piston rod, first and second sides on said piston head facing said first and second end walls, respectively, said piston head dividing the space in said cylinder between said first and second end walls into a first cylinder chamber between said first side and said first end wall and into a second cylinder chamber between said second side and said second end wall, guide means for guiding said piston means for linear movement relative to said cylinder, a first fluid-tight bellows in said first chamber mounted in sealed relationship between said first end wall and said first side of said piston, a second fluid-tight bellows in said second chamber mounted in sealed relationship between said second end wall and said second side of said piston, said first portion of said piston rod being located within said second bellows, fluid in said first and second cylinder chambers located entirely outside of said first and second bellows, respectively, orifice means located relative to said piston head for permitting flow of fluid past said piston head between said first and second cylinder chambers during movement of said piston head, first engagement means on said cylinder for effecting engagement between said cylinder and a first external object, and second engagement means on said second portion of said shaft for effecting engagement between said shaft and a second external object which is movable relative to said first external object.

2. A damper as set forth in claim 1 wherein said guide means includes means in said second end wall for guiding said second portion of said piston rod.

3. A damper as set forth in claim 2 wherein said last-mentioned means comprises a bushing with a clearance from said second portion of said piston rod.

4. A damper as set forth in claim 1 wherein said guide means includes means on said piston head for guiding movement thereof within said cylinder.

5. A damper as set forth in claim 4 wherein said guide means includes means in said second end wall for guiding said second portion of said piston rod.

6. A damper as set forth in claim 1 including first and second vent means in said first and second end walls, respectively, for permitting communication between said internal portions of each of said first and second bellows and the environment outside of said cylinder.

7. A damper as set forth in claim 6 wherein said guide means includes means in said second end wall for guiding said second portion of said piston rod.

8. A damper as set forth in claim 7 wherein said guide means includes means on said piston head for guiding movement thereof within said cylinder.

9. A damper as set forth in claim 6 including duct means in said piston head for permitting communication between said first and second bellows.

10. A damper as set forth in claim 1 including pressure relief valve means in said piston head for effecting pressure relief in both directions of movement of said piston head when the pressure in said first and second chambers exceeds predetermined values.

11. A damper as set forth in claim 1 wherein said guide means includes means on said piston head for guiding movement thereof within said cylinder.

12. A damper as set forth in claim 11 wherein said means on said piston head comprise a plurality of circumferentially spaced bosses.

13. A damper as set forth in claim 12 wherein said guide means also include bushing means in said second end wall for guiding said piston rod.

14. A damper as set forth in claim 1 wherein said guide means includes a first elongated tubular member affixed to and extending outwardly from said first side of said piston head toward said first end wall, a second tubular member affixed to and extending outwardly from said second side of said piston head toward said second end wall, said first and second bellows being located within said first and second tubular members, respectively, first and second substantially frictionless seal means secured to said cylinder and engaging said first and second tubular members, respectively, on opposite sides of said piston head, said first seal means dividing said first chamber into a third chamber between it and said piston head and a fourth chamber between it and said first end wall, said second seal means dividing said second chamber into a fifth chamber between it and said piston head and a sixth chamber between it and said second end wall, and conduit means within said first and second tubular members and on the outside of said first and second bellows for effecting communication between said fourth and sixth chambers.

15. A damper as set forth in claim 14 wherein said guide means includes means in said second end wall for guiding said second portion of said piston rod.

16. A damper as set forth in claim 15 wherein said last-mentioned means comprises a bushing with a clearance from said second portion of said piston rod.

17. A damper as set forth in claim 14 including first and second vent means in said first and second end walls, respectively, for permitting communication between said internal portions of each of said first and second bellows and the environment outside of said cylinder.

18. A fluid damper comprising a cylinder, first and second end walls on said cylinder, piston means in said cylinder, first and second sides on said piston means, said piston means dividing said cylinder into a first chamber between said first side and said first end wall and into a second chamber between said second side and said second end wall, a first bellows in said first chamber and having opposite ends in fluid-tight engagement with said first side and said first end wall, a second bellows in said second chamber and having opposite ends in fluid-tight engagement with said second side and said second end wall, an internal surface on said cylinder, fluid located in said first chamber between said first bellows and said internal surface and located in said second chamber between said second bellows and said internal surface, guide means for guiding said piston means for movement toward and away from said first and second end walls, and orifice means located relative to said piston means for permitting flow of fluid between said first and second chambers in response to said movement of said piston means toward and away from said first and second end walls.

19. A damper as set forth in claim 18 including first and second vent means in said first and second end walls, respectively, for permitting communication of said first and second bellows, respectively, with the atmosphere.

20. A damper as set forth in claim 18 including pressure relief valve means in said piston means to permit pressure relief between fluid in said first and second chambers.

21. A damper as set forth in claim 18 including first and second tubular members extending outwardly away from said first and second sides, respectively, and wherein said guide means comprise means extending inwardly from said cylinder for engaging said first and second tubular members.

22. A damper as set forth in claim 21 wherein said guide means additionally confine fluid on opposite sides of said piston means.

* * * * *